(12) United States Patent
Wan et al.

(10) Patent No.: US 10,554,992 B2
(45) Date of Patent: Feb. 4, 2020

(54) INLINE CODEC SWITCHING

(71) Applicant: Avago Technologies International Sales Pte. Limited, Irvine, CA (US)

(72) Inventors: Wade Wan, Orange, CA (US); Olive Tao, Saratoga, CA (US); Waqar Ahmad, Andover, MA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 196 days.

(21) Appl. No.: 15/172,023

(22) Filed: Jun. 2, 2016

(65) Prior Publication Data

US 2016/0360217 A1 Dec. 8, 2016

Related U.S. Application Data

(60) Provisional application No. 62/342,725, filed on May 27, 2016, provisional application No. 62/170,585, filed on Jun. 3, 2015.

(51) Int. Cl.
| | |
|---|---|
| *H04L 29/06* | (2006.01) |
| *H04N 19/30* | (2014.01) |
| *H04N 19/70* | (2014.01) |
| *H04N 19/46* | (2014.01) |

(52) U.S. Cl.
CPC .................. *H04N 19/46* (2014.11)

(58) Field of Classification Search
CPC ........ H04N 19/70; H04N 19/44; H04N 19/46; H04N 19/136; H04N 19/157; H04N 19/39; H04N 19/42; H04N 21/4384; H04N 21/44016; H04N 21/4516; H04N 21/85406; H04N 19/187; H04N 19/188; H04N 19/30; H04L 65/607
See application file for complete search history.

(56) References Cited

U.S. PATENT DOCUMENTS

| | | | | |
|---|---|---|---|---|
| 2013/0287123 | A1* | 10/2013 | Rusert | G06F 17/30516 375/240.26 |
| 2013/0322628 | A1* | 12/2013 | Rhyu | H04N 21/266 380/255 |
| 2015/0091927 | A1* | 4/2015 | Cote | G06T 1/60 345/547 |
| 2016/0234517 | A1* | 8/2016 | Samuelsson | H04N 19/70 |

(Continued)

*Primary Examiner* — Alison Slater
(74) *Attorney, Agent, or Firm* — Sterne, Kessler, Goldstein & Fox P.L.L.C.

(57) ABSTRACT

Techniques described herein are directed to the inline switching of video and/or audio codecs for video and/or audio data. A first device encodes data that includes portion(s) that are encoded using a first codec and portion(s) that are encoded using a second codec. The encoder may further encode supplemental information in the data. The supplemental information is used by the decoder to determine a transition between the first and second portion(s). The decoder can thus anticipate the transition and properly switch the codec used to decode the data in real-time. Techniques described herein are also directed to the splicing of locally-stored content into content received from a remotely-located source. For example, targeted advertisements that are stored locally may be played back during commercial breaks of live content. The locally-stored targeted advertisements may replace the commercials provided via the remotely-located source.

17 Claims, 7 Drawing Sheets

(56) References Cited

U.S. PATENT DOCUMENTS

| | | | |
|---|---|---|---|
| 2016/0261877 A1* | 9/2016 | Wang | H04N 19/597 |
| 2016/0381385 A1* | 12/2016 | Ugur | H04N 19/30 |
| | | | 375/240.12 |

* cited by examiner

FIG. 10 ial Patent
INLINE CODEC SWITCHING

CROSS-REFERENCE TO RELATED APPLICATIONS

This application claims priority to U.S. Provisional Patent Application No. 62/170,585, filed Jun. 3, 2015, and U.S. Provisional Patent Application No. 62/342,725, filed May 27, 2016, the entireties of which are incorporated by reference herein.

BACKGROUND

Technical Field

The subject matter described herein relates to video/audio data processing.

Background Art

Traditionally, video data has been delivered in a careful manner to avoid codec switches for fear that glitches would occur when the content switches between codecs. At the systems layer, there is typically signaling to indicate the video codec. For example, for Moving Picture Experts Group (MPEG)-2 transport streams, the video codec is indicated using the stream_type parameter in the PMT (Program Map Table). This is adequate for one-time initialization and is currently the method used to initialize a video decoder and is the mechanism used to specify the codec to use when tuning to another television channel. However, this signaling is problematic for on-the-fly switching purposes. Systems/transport level processing are often performed in a different block in the pipeline which creates synchronization issues. In particular, during systems/transport level processing, synchronization issues can occur between a video decoder that receives video data from a transport engine and a processor (e.g., a central processing unit (CPU)) that receives program-specific information (PSI) that specifies the video codec to use when decoding the video data.

BRIEF SUMMARY

Methods, systems, and apparatuses are described for processing video and/or audio data, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

In embodiments, a method performed by a decoding device is described herein. In accordance with the method, encoded data comprising a first portion that is encoded in accordance with a first codec and a second portion that is encoded in accordance with a second codec are received. The first portion of the encoded data is decoded in accordance with the first codec to obtain decoded data. A determination is made that the decoded data includes supplemental information that indicates a transition point after which the encoded data transitions to the second portion. The second portion of the encoded data is decoded in accordance with the second codec based on the supplemental information.

A method performed by an encoding device is also described herein. In accordance with the method, supplemental information is inserted in a first portion of data, the first portion to be encoded in accordance with a first codec, the supplemental information indicating a transition point after which a second portion of data is to be encoded in accordance with a second codec. A marker is inserted in the first portion of data, the marker corresponding to the end of the first portion.

Another method performed by a decoding device is described herein. In accordance with the method, a first portion of encoded data and a second portion of the encoded data are received from a first source external to the decoding device, the first portion and the second portion being encoded in accordance with a first codec. The first portion of the encoded data is decoded in accordance with the first codec to obtain decoded data. A determination is made that the decoded data includes supplemental information that indicates a transition point after which encoded data stored locally to the decoding device is to be decoded instead of the second portion of the encoded data, the encoded data stored locally to the decoded device being encoded in accordance with a second codec. In response to reaching the transition point, the encoded data stored locally to the decoding device is decoded instead of the second portion of the encoded data, the encoded data stored locally to the decoding device being decoded in accordance with the second codec based on the supplemental information.

Example Embodiments

Techniques described herein are directed to the inline switching of video and/or audio codecs for video and/or audio data. For example, a first device may encode data (e.g., video and/or audio data), wherein one or more first portions of the data is encoded in accordance with a first video codec, and one or more second portions of the video data are encoded in accordance with a second video codec. The encoder may further encode supplemental information in the data. The supplemental information is used by the decoder to determine a transition between the first and second portion(s). The decoder can thus anticipate the transition and properly switch the codec used to decode the data in real-time.

Techniques described herein are also directed to the splicing of locally-stored content into content received from a remotely-located source. For example, targeted advertisements that are stored locally may be played back during commercial breaks of live content. The locally-stored targeted advertisements may replace the commercials provided via the remotely-located source.

The techniques described herein offer several advantages. For example, techniques described herein allow operators to avoid having to both create and store the same commercial in different formats to match a particular channel on which encoded video and/or audio data is transmitted. That is, a commercial encoded in accordance with the MPEG-2 codec (on an existing channel (e.g., a television channel) that has been paired with MPEG-2 programming) can be reused with Advanced Video Coding (AVC) programming instead of creating an AVC version to pair with AVC programming on another channel.

Techniques described herein can also be used for adaptive streaming manifests. For example, current Dynamic Adaptive Streaming over HTTP (DASH) manifests may identify AVC video having resolutions up to High-Definition (HD). If an operator would like to add higher resolutions (e.g., 4K resolution), the operator would have to use High Efficiency Video Coding (HEVC) because using AVC coding would result in unusable bitrates that are too high. Thus, operators face the problem of also needing to add lower resolutions in the HEVC format to support adaptive streaming from the 4K HEVC format. The techniques described herein may be used by an encoder or a decoder to switch between the AVC and HEVC codecs (or any other codecs) when adaptively encoding/decoding video and/or audio data.

Figure 1:
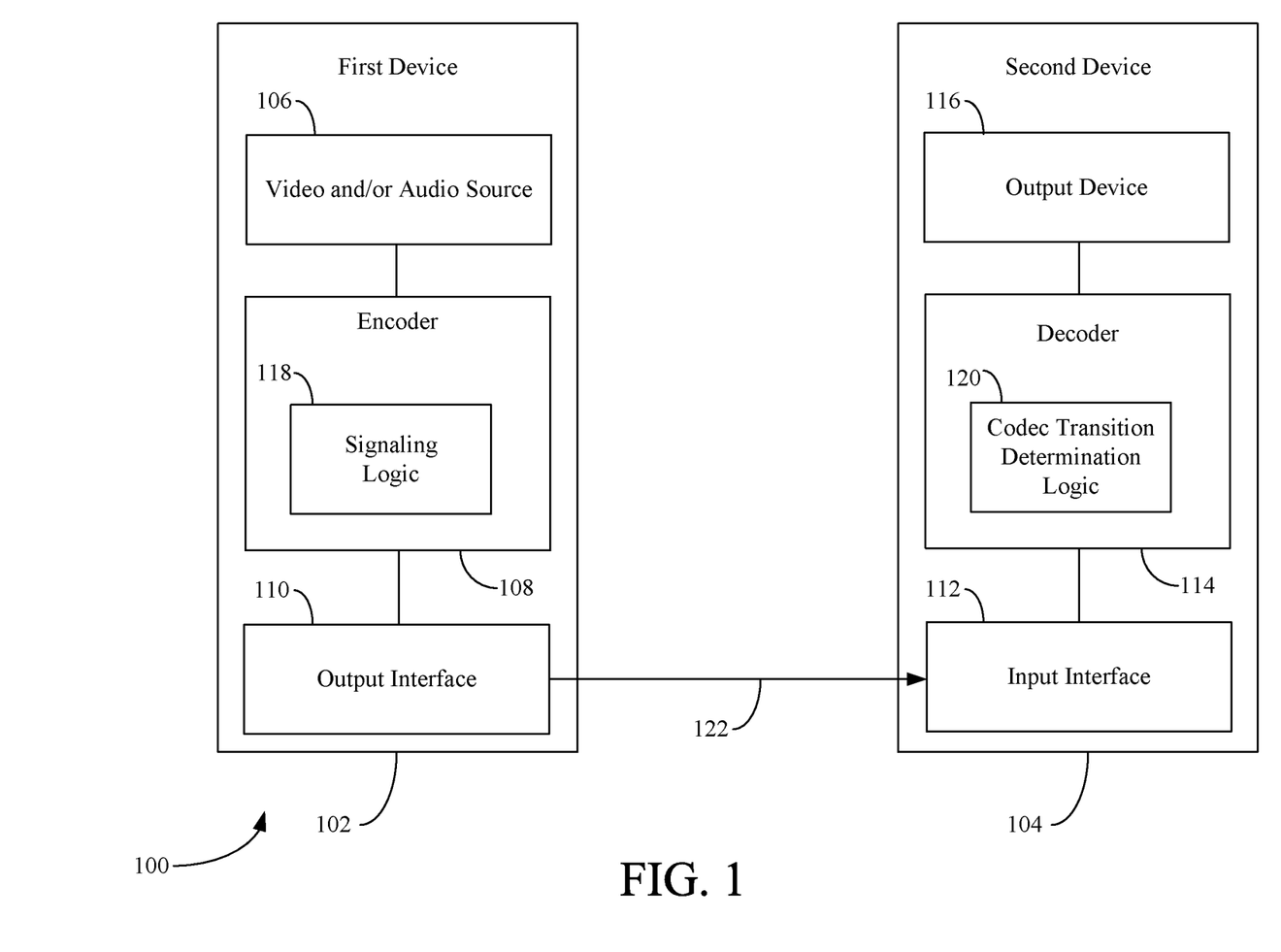
FIG. 1 shows a block diagram of an example encoding and decoding system in accordance with an embodiment.

FIG. 1 shows a block diagram of an example encoding and decoding system 100 in accordance with an embodiment. As shown in FIG. 1, system 100 includes a first device 102 and a second device 104. First device 102 is configured to generate encoded data (e.g., video and/or audio data) to be decoded by second device 104. First device 102 may be a computing device, including a desktop computer, a mobile device (e.g., a laptop computer, a notebook computer, a tablet computer, a smart phone, etc.), a video streaming device, a camera, etc. Second device 104 may be a computer device, including a desktop computer, a mobile device (e.g., a laptop computer, a notebook computer, a tablet computer, a smart phone, etc.), a set-top box, a television (or any other display device), a digital media player, a video gaming console, a video streaming device, etc.

First device 102 includes a video and/or audio source 106, an encoder 108, and an output interface 110. Video and/or audio source 106 may include a source for video and/or audio data such as a video and/or capture device (e.g., a video camera, a microphone, etc.), a data store containing previously-captured video and/or audio data, a video and/or audio feed interface to receive video and/or audio from a video and/or audio content provider, and/or a combination of such sources.

Encoder 108 is configured to encode video and/or audio data in accordance with one or more video and/or audio codecs and output an encoded bit stream of data to be provided to another device (e.g., second device 104). For example, in accordance with an embodiment in which multiple video codecs are used, encoder 108 encodes the video data such that one or more or first portions (e.g., pictures) of the video data are encoded in accordance with a first video codec and one or more second portions of the video data are encoded in accordance with a second video codec. It is noted that a picture can be either a video frame or a field. A video frame is a complete image captured during a known time interval (e.g., a progressive frame), and a field is the set of odd-numbered or even-numbered scanning lines composing a partial image (e.g., an interlaced frame). In accordance with an embodiment in which multiple audio codes are used, encoder 108 encodes the audio data such that one or more or first portions (e.g., audio frames) of the audio data are encoded in accordance with a first audio codec and one or more second portions of the audio data are encoded in accordance with a second audio codec.

Examples of video and/or audio codecs that may be used by encoder 108 may include, but are not limited to, an AVC codec, an HEVC codec, an MPEG-based codec (e.g., MPEG-2 codec, an MPEG-4 codec, etc.), an Advanced Television Systems Committee (ATSC)/European Telecommunications Standards Institute (ETSI)-based codec (e.g., Audio Codec 3 (AC-3) (also known as, "Dolby Digital")), etc.

As further shown in FIG. 1, encoder 108 includes signaling logic 118. Signaling logic 118 is configured to insert supplemental information into the first portion of data. The supplemental information signals a change in a video and/or audio codec within the data. The inserted supplemental information may be encoded in the video layer and/or audio layer (as opposed to a higher layer, such as the transport layer). The supplemental information may be inserted after a bit stream corresponding to a particular one or more pictures (and/or audio frames) that comprise the video data (and/or audio data). The supplemental information may indicate the location of the transition between different codecs within the data. For example, the supplemental information may indicate the remaining number of picture(s) and/or audio frame(s) that are to be decoded by a decoder (e.g., decoder 114) in accordance with a first codec, may indicate a particular picture number (e.g., video frame number), audio frame number, and/or may indicate the transition in another manner. In one embodiment, the supplemental information is inserted into the bit stream before the first picture (or first audio frame) that is to be decoded in accordance with a second codec that is different than the first codec to provide advance warning to decoder 108. In this way, decoder 108 can anticipate the change in codecs and properly decode the video and/or audio data in accordance with the second codec. Alternatively, the supplemental information may be located elsewhere in the bit stream. Signaling logic 118 may further encode a marker after the last picture (and/or last audio frame) that indicates to decoder 108 that no more pictures and/or audio frames are to be decoded in accordance with the first codec and/or that subsequent picture(s) and/or audio frame(s) are to be decoded in accordance with the second codec indicated by the supplemental information.

In accordance with an embodiment, the supplemental information may be inserted after a bit stream corresponding to the last picture (and/or audio frame) (in decode order) before the transition. In accordance with another embodiment, the supplemental information may be inserted after a bit stream corresponding to one or more pictures (or and/or audio frame(s)) before the last picture (and/or last audio frame) before the transition. In accordance with such an embodiment, the supplemental information further indicates how many more picture(s) (and/or audio frame(s)) are to be decoded before the transition.

The supplemental information may further specify the codec to be used by decoder 108 after the transition, a profile/level/tier of the video and/or audio data to be decoded after the transition point, the resolution of the video and/or audio data to be decoded after the transition point, the picture rate and/or sample rate of the video and/or audio data to be decoded after the transition point, among other useful information.

The supplemental information used to signal a change in a video codec may be in the form of a supplemental enhancement information (SEI) message (as used in the AVC and HEVC codecs) or User Data (UD) (as used in the MPEG-2 codec). The supplemental information used to signal a change in an audio codec may be in the form of "ancillary data" for MPEG-based audio codecs or may be encoded into the "auxbits" used for ATSC/ETSI-based codecs.

The encoded video and/or audio data (containing the supplemental information) may be provided to second device 104 via output interface 110 of first device 102. Output interface 110 may transmit the encoded video and/or audio data via communications link 118. In accordance with an embodiment, the encoded video and/or audio data provided via output interface 110 is a live stream comprising one of a live internet stream, a live satellite stream or a live over-the-air stream.

Second device 104 may receive and decode the encoded video and/or audio data received from first device 102. Second device 104 includes an input interface 112, a decoder 114, and an output device 116. Input interface 112 receives the encoded video and/or audio data over communications link 118. Communications link 118 may comprise any type of medium capable of transmitting the encoded data from first device 102 to second device 104. In one example, communications link 118 may comprise a communication medium to enable first device 102 to provide encoded video and/or audio data to second device 104 in real-time. The encoded video and/or audio data may be modulated according to a communication standard, such as a wireless communication protocol, and transmitted to second device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from first device 102 to second device 104.

Decoder 114 is configured to decode the encoded video and/or audio data received from first device 102 in accordance with one or more video and/or audio codecs. As described above, video and/or audio data may be encoded in accordance with more than one video and/or audio codec. Decoder 114 may be configured to switch between different codecs in real-time to properly decode the video and/or audio data.

For example, as shown in FIG. 1, decoder 114 includes codec transition determination logic 120, which is configured to determine which codec to use for decoding purposes. For instance, codec transition determination logic 120 may be configured to extract (e.g., decode) the supplemental information that has been encoded in the video and/or audio data by encoder 108 as described above. Codec transition determination logic 120 determines a transition point after which a different codec is to be used to decode the video and/or audio data based on the supplemental information. Codec transition determination logic 120 is configured to determine the transition point before receiving the video and/or audio data that is encoded in accordance with the different codec, thereby enabling decoder 114 to configure itself to decode such video and/or audio data in advance. For example, after determining the transition point, decoder 114 may flush out all the data (e.g., picture and/or audio frames) decoded before the determined transition point and reinitialize and/or configure itself to be ready for subsequent data based on the information determined from the supplemental information. In accordance with an embodiment, the transition point is the marker encoded in the data (e.g., an End of Sequence (EOS) indicator).

The decoded video and/or audio data may be displayed and/or played back via output device 116. Output device 116 may be integrated with, or external to, second device 104. In some examples, second device 104 may include an integrated output device and also be configured to interface with an external output device. In other examples, second device 104 may be an output device. Second device 104 may comprise any of a variety of output devices such as a liquid crystal display (LCD), a plasma display, an organic light emitting diode (OLED) display, an audio amplifier, one or more speakers, and/or any other type of output device.

Examples of video and/or audio codecs that may be used by decoder 114 may include, but are not limited to, an AVC codec, an HEVC codec, an MPEG-based codec, an ATSC/ETSI-based codec, etc.

Figure 2:
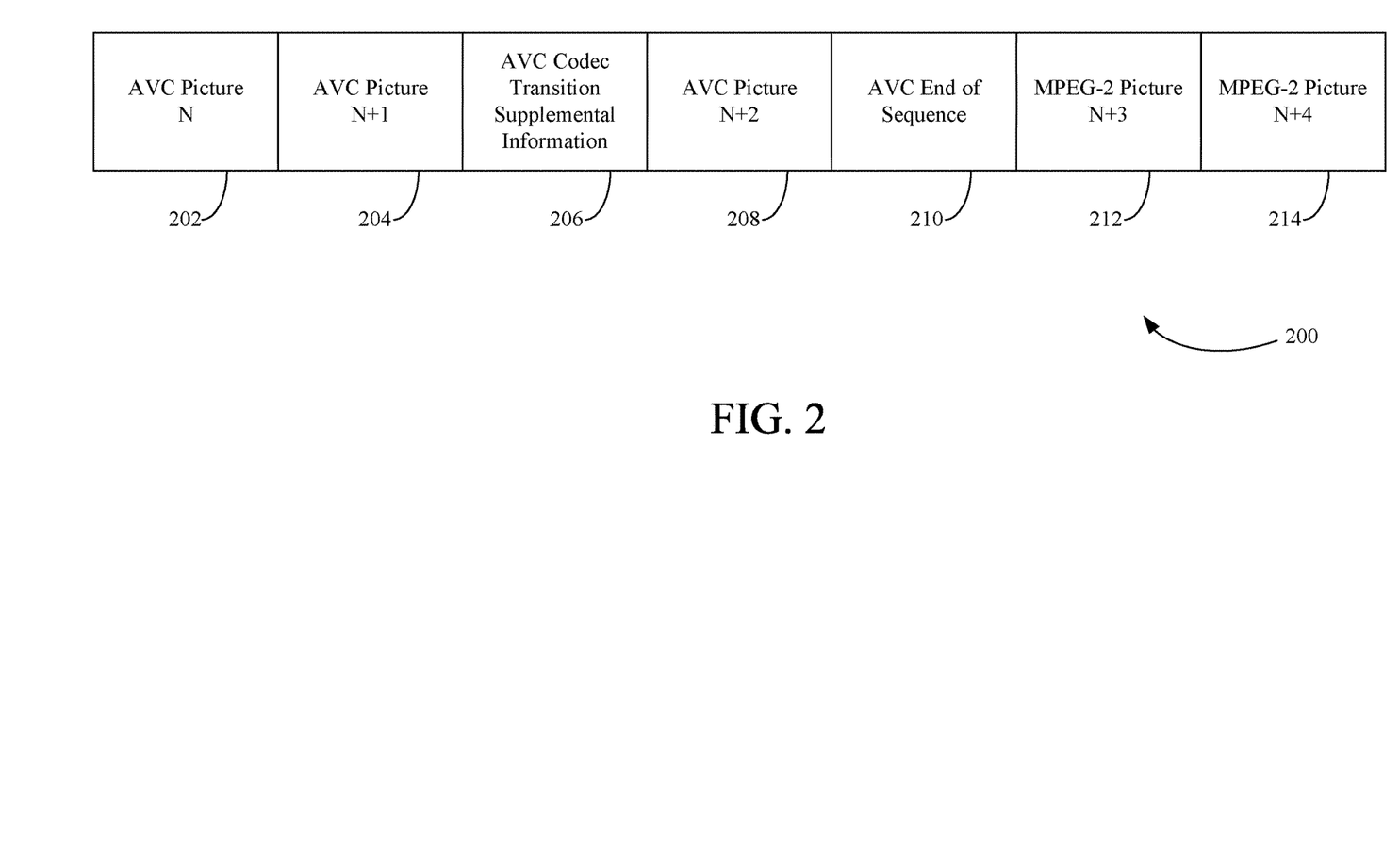
FIG. 2 shows a stream of video data that includes supplemental information in accordance with an embodiment.

FIG. 2 shows a stream 200 of video data that includes supplemental information in accordance with an embodiment. Stream 200 is video data encoded by an encoder (e.g., encoder 108, as shown in FIG. 1) and received by a decoder (e.g., decoder 114, as shown in FIG. 1). As shown in FIG. 2, stream 200 includes a first picture 202 encoded in accordance with the AVC codec (AVC picture N), a second picture 204 encoded in accordance with the AVC codec (AVC Picture N+1), supplemental information 206 (AVC Codec Transition SEI), a third picture 208 encoded in accordance with the AVC codec (AVC Picture N+2), a marker 210 (AVC End of Sequence), a fourth picture 212 encoded in accordance with the MPEG-2 codec (MPEG-2 Picture N+3) and a fifth picture 214 encoded in accordance with the MPEG-2 codec (MPEG-2 Picture N+4).

When received by a decoder, the decoder initially decodes stream 200 in accordance with the A VC codec. Upon detecting supplemental information 206 during the decoding process, the decoder determines that a particular number of A VC pictures (e.g., one picture, as shown in FIG. 2) has to be decoded before an EOS indicator (i.e., marker 210) is decoded. For example, supplemental information 206 may indicate that one picture (i.e., third picture 208) is left to be decoded before marker 210. Marker 210 indicates to the decoder that subsequent data in stream 200 (e.g., video data to be decoded after marker 210) is to be decoded in accordance with another codec (e.g., MPEG-2, as shown in FIG. 2). By the time marker 210 is detected during the decoding process, the decoder has flushed out all the decoded picture and reinitializes/configures itself to be ready for subsequent data (e.g., pictures) based on the information determined from supplemental information 206.

Supplemental information 206 advantageously defines the exact location of the transition between the different codecs (e.g., the AVC codec and the MPEG-2 codec, as shown in FIG. 2), thereby enabling the decoder to anticipate the change in codecs and properly configure itself to handle the new codec. It is noted that the very first picture after the transition point should be a properly constructed random access point for the new codec to begin to decode properly.

Figure 3:
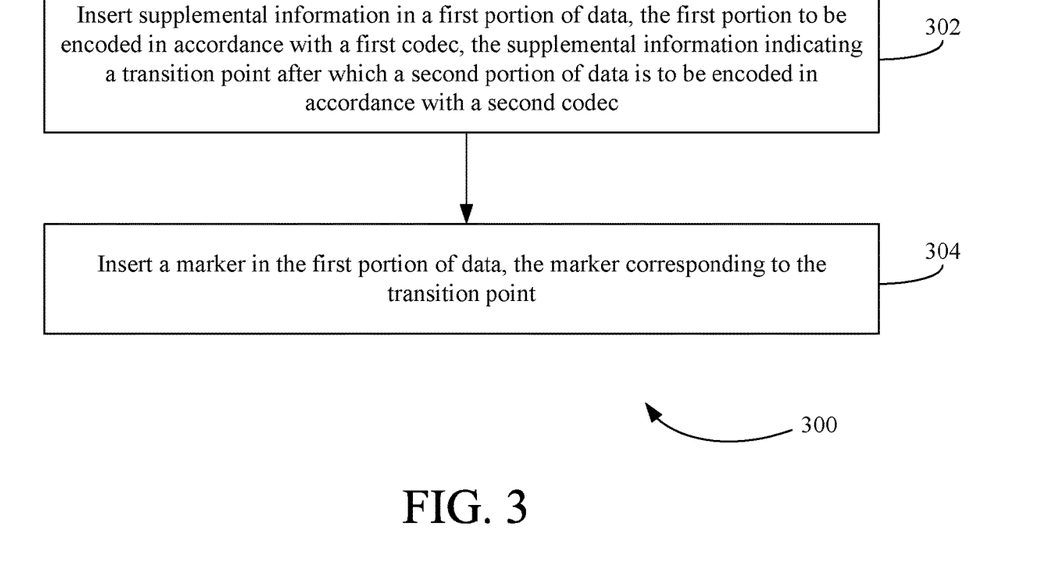
FIG. 3 shows a flowchart providing an example process performed by an encoder to encode data to include signaling information in accordance with an embodiment.
Figure 4:
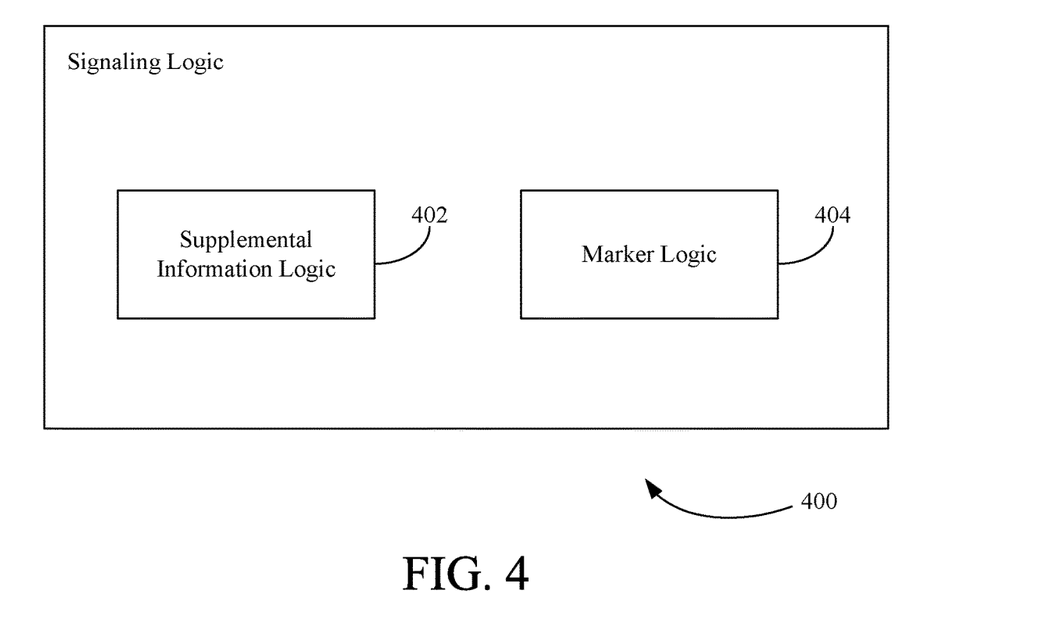
FIG. 4 shows a block diagram of signaling logic in accordance with an embodiment.

Accordingly, in embodiments, an encoder may encode data to include signaling information to inform a decoder of a codec change in many ways. For instance, FIG. 3 shows a flowchart 300 providing an example process performed by an encoder to encode data to include signaling information in accordance with an embodiment. Flowchart 300 may be performed by signaling logic 118 of encoder 108, as shown in FIG. 1 for example. For illustrative purposes, flowchart 300 is described with respect to signaling logic 400 shown in FIG. 4, which is an example of signaling logic 118, according to an embodiment. As shown in FIG. 4, signaling logic 400 includes supplemental information logic 402 and marker logic 404. Further structural and operational embodiments will be apparent to persons skilled in the relevant art(s) based on the discussion regarding flowchart 300.

As shown in FIG. 3, a supplemental information is inserted in a first portion of data, the first portion to be encoded in accordance with a first codec, the supplemental information indicating a transition point after which a second portion of data is to be encoded in accordance with a second codec (302). For example, with reference to FIG. 4, supplemental information logic 402 inserts supplemental information in a first portion of data.

In accordance with one or more embodiments, the data is at least one of video data or audio data.

In accordance with one or more embodiments, the first portion comprises one or more first pictures that are to be encoded in accordance with the first codec and the second portion comprises one or more second pictures that are to be encoded in accordance with the second codec.

In accordance with one or more embodiments, the supplemental information is inserted after a last picture in a sequence of the one or more first pictures. For example, with reference to FIG. 3, supplemental information logic 402 may insert the supplemental information after a bit stream corresponding to the last picture.

In accordance with one or more embodiments, the supplemental information is inserted after a picture before a last picture in a sequence of the one or more first pictures. For example, with reference to FIG. 3, supplemental information logic 402 may insert the supplemental information after a bit stream corresponding to the picture before the last picture.

In accordance with one or more embodiments, the supplemental information also indicates at least one of the second codec to be used to decode the second portion of the encoded data, one or more of a profile, level, and tier of the second portion of the encoded data, or a resolution of the second portion of the encoded data.

In accordance with one or more embodiments, the supplemental information is a Supplemental Enhancement Information message (e.g., as used in the AVC and HEVC codecs).

In accordance with one or more embodiments, the supplemental information is User Data (e.g., as used in the MPEG-2 codec).

Continuing with flowchart 300, a marker is inserted in the first portion of data, the marker corresponding to the transition point (304). For example, with reference to FIG. 3, marker logic 404 inserts a marker in the first portion of data.

In accordance with one or more embodiments, the supplemental information inserted in step 302 further indicates a number of pictures of the one or more first pictures that are to be decoded before the marker.

In accordance with one or more embodiments, the marker is an EOS indicator (e.g., EOS indicator 210, as shown in FIG. 2).

Figure 5:
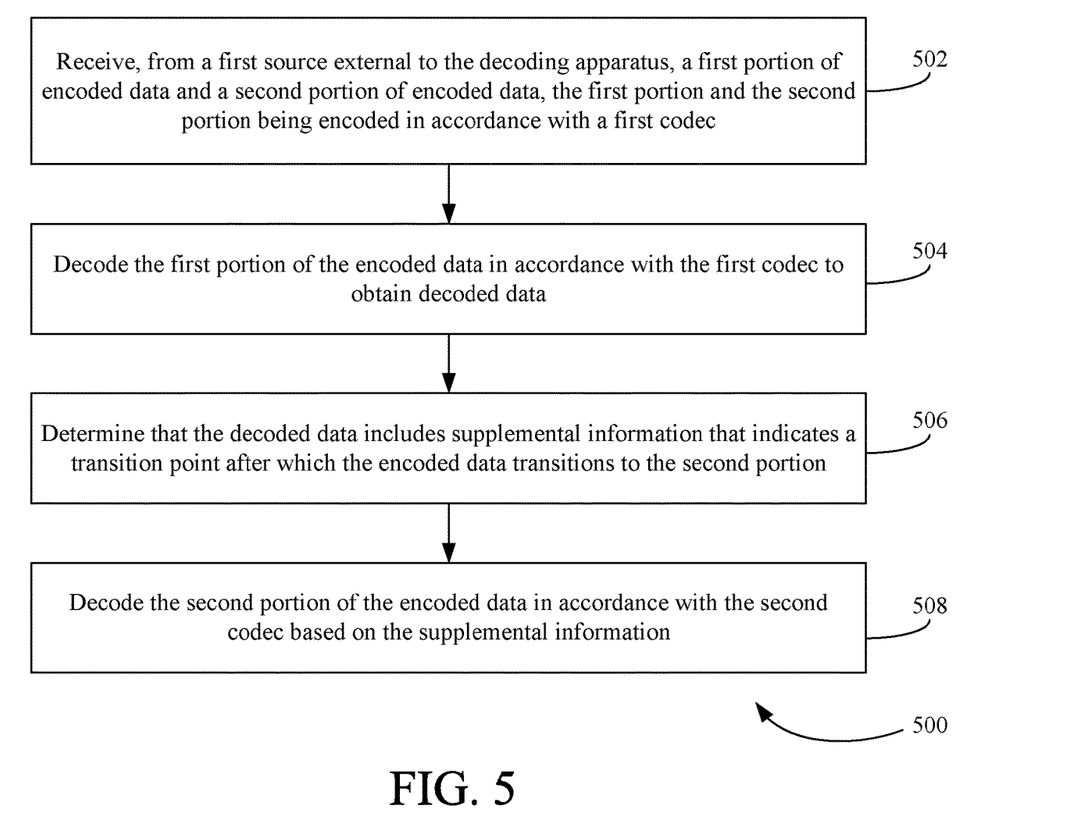
FIG. 5 shows a flowchart providing an example process performed by a decoder to decode data to perform inline codec switching in accordance with an embodiment.
Figure 6:
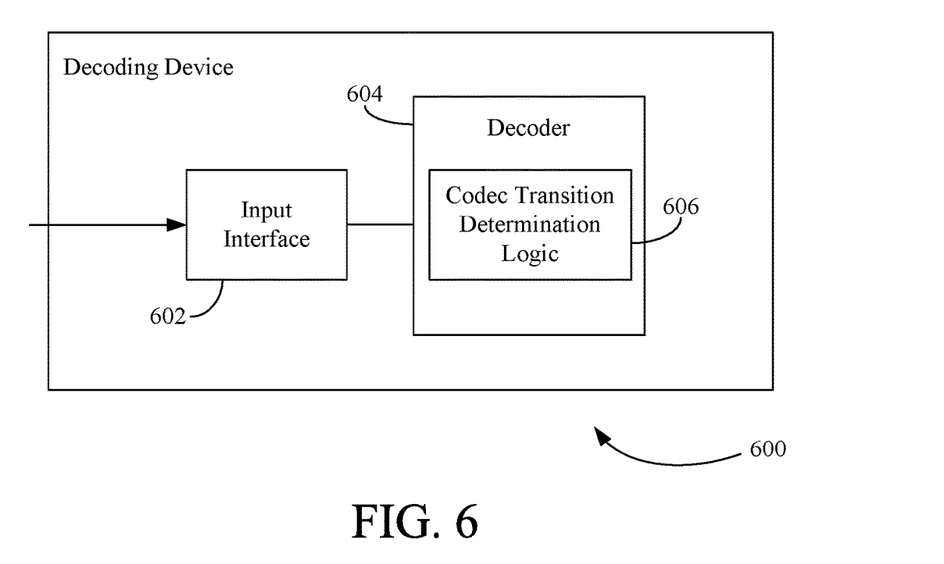
FIG. 6 shows a block diagram of an example decoding device in accordance with an embodiment.

In embodiments, a decoder may decode data to perform inline code switching information in many ways. For instance, FIG. 5 shows a flowchart 500 providing an example process performed by a decoder to decode data to perform inline codec switching in accordance with an embodiment. Flowchart 500 may be performed by second device 104, as shown in FIG. 1 for example. For illustrative purposes, flowchart 500 is described with respect to decoding device 600 shown in FIG. 6, which is an example of second device 104, according to an embodiment. As shown in FIG. 6, decoding device 600 includes an input interface 602 and a decoder 604. Decoder 604 includes codec transition determination logic 606. Input interface 602, decoder 604 and code transition determination logic 606 are examples of input interface 112, decoder 114, and codec transition determination logic 120, as respectively shown in FIG. 1. Further structural and operational embodiments will be apparent to persons skilled in the relevant art(s) based on the discussion regarding flowchart 500.

As shown in FIG. 5, encoded data comprising a first portion that is encoded in accordance with a first codec and a second portion that is encoded in accordance with a second codec are received (502). For example, with reference to FIG. 6, input interface 602 receives the encoded data (e.g., from another device such as first device 102 shown in FIG. 1.)

In accordance with one or more embodiments, the encoded data comprises at least one of encoded video data or encoded audio data.

In accordance with one or more embodiments, the first portion comprises one or more first pictures that are encoded in accordance with the first codec and the second portion comprises one or more second pictures that are encoded in accordance with the second codec.

Continuing with flowchart 500, the first portion of the encoded data is decoded in accordance with the first codec to obtain decoded data (504). For example, with reference to FIG. 6, decoder 604 decodes the first portion of the encoded data in accordance with the first codec to obtain decoded data.

Continuing with flowchart 500, a determination is made that the decoded data includes supplemental information that indicates a transition point after which the encoded data transitions to the second portion (506). For example, with reference to FIG. 6, codec transition determination logic 606 determines that the decoded data includes supplemental information that indicates a transition point after which the encoded data transitions to the second portion.

In accordance with one or more embodiments, the transition point may correspond to a marker (e.g., EOS indicator 210, as shown in FIG. 2). The marker indicates that the bit stream that is to be decoded in accordance with the first codec is ending and that subsequent data is to be decoded in accordance with another codec that is specified by the supplemental information.

In accordance with one or more embodiments, the supplemental information is located after a last picture in a sequence of the one or more first pictures. For example, the supplemental information may be located after a bit stream corresponding to the last picture.

In accordance with one or more embodiments, the supplemental information is located after a picture before a last picture in a sequence of the one or more first pictures. For example, the supplemental information may be located after a bit stream corresponding to the picture before the last picture.

In accordance with one or more embodiments, the supplemental information further indicates a number of pictures of the one or more first pictures that are to be decoded before the transition point.

In accordance with one or more embodiments, the supplemental information also indicates at least one of the second codec to be used to decode the second portion of the encoded data, one or more of a profile, level, and tier of the second portion of the encoded data, or a resolution of the second portion of the encoded data.

In accordance with one or more embodiments, the supplemental information is a Supplemental Enhancement Information message (e.g., as used in the AVC and HEVC codecs).

In accordance with one or more embodiments, the supplemental information is User Data (e.g., as used in the MPEG-2 codec).

Continuing with flowchart 500, the second portion of the encoded data is decoded in accordance with the second codec based on the supplemental information (508). For example, with reference to FIG. 6, decoder 604 decodes the second portion of the encoded data in accordance with the second codec based on the supplemental information.

Figure 7:
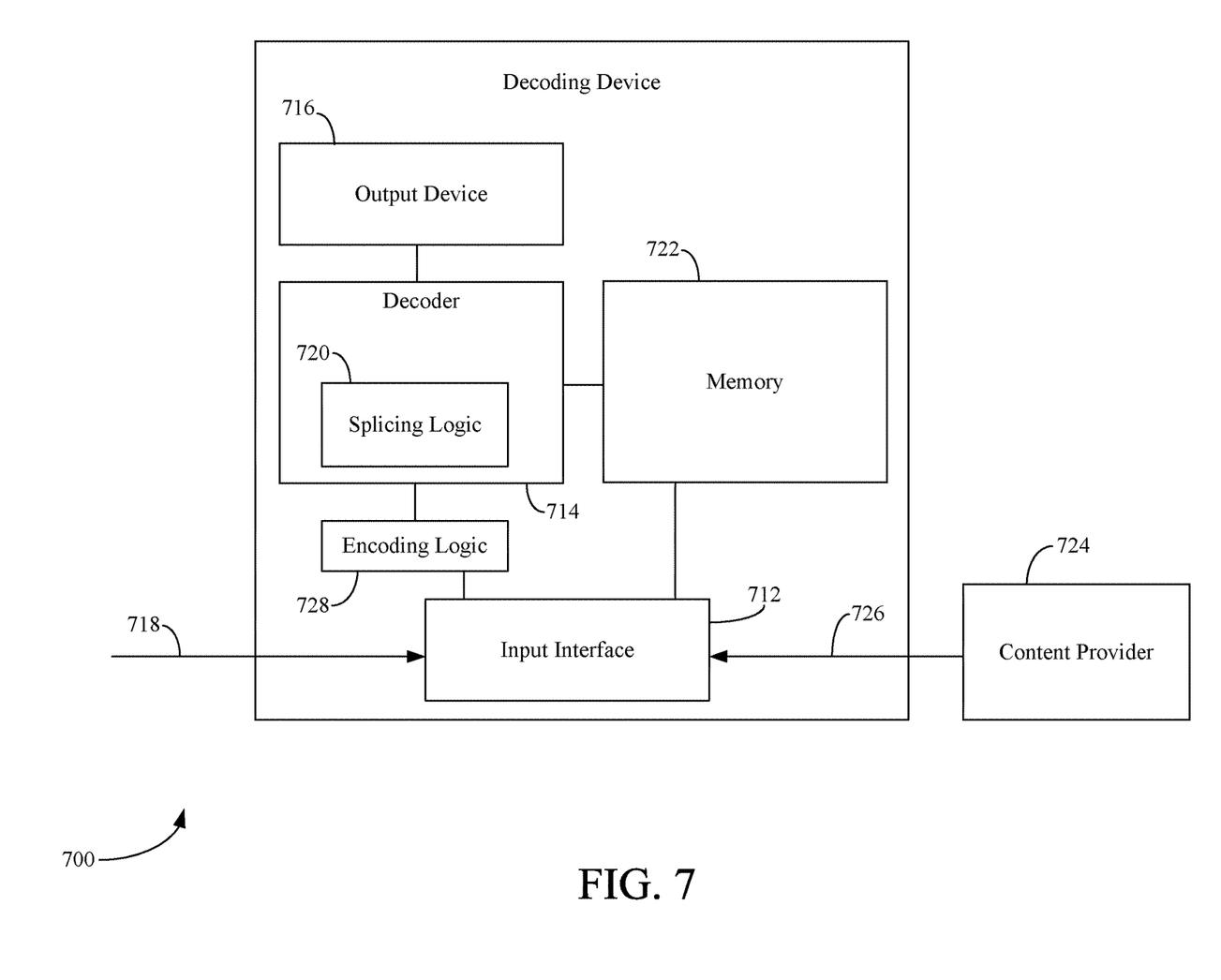
FIG. 7 is a block diagram of an example decoding device configured to splice locally-stored content into content received from a remotely-located source in accordance with an embodiment.

Embodiments described herein may be further directed to the splicing of locally-stored content into content received from a remotely-located source. For example, techniques may be implemented that enable targeted advertisements that are stored locally to be played back during commercial breaks of live content. The locally-stored targeted advertisements may replace the commercials provided via the remotely-located source. For instance, FIG. 7 is a block diagram of a decoding device 700 configured to splice locally-stored content into content received from a remotely-located source. The locally-stored content may be encoded in accordance with a different codec than the content received from a remotely-located source. As shown in FIG. 7, decoding device 700 includes an input interface 712, a decoder 714, an output device 716, a memory 722, and encoding logic 728. Decoding device 700 may be an example of second device 104, as shown in FIG. 1. Accordingly, input interface 712, a decoder 714, and output device 716 may be examples of input interface 112, decoder 114, and output device 116, as shown in FIG. 1.

Input interface 712 receives encoded video and/or audio data from a device (e.g., first device 102, as shown in FIG. 1) over communications link 718. The encoded video and/or audio data received via communications link 718 may be encoded in accordance with a first codec. Communications link 718 may be an example of communications link 118, as shown in FIG. 1.

Input interface 712 may be further configured to receive encoded video and/or audio data from another entity, such as content provider 724. The encoded video and/or audio data may be received via communications link 726. The encoded video and/or audio data received via communications link 726 may be encoded in accordance with a second codec that is different than the first codec. Communications link 726 may comprise any type of medium capable of transmitting the encoded data from content provider 724 to decoding device 700. In one example, communications link 726 may comprise a communication medium to enable content provider 724 to provide encoded video and/or audio data to decoding device 700. The video and/or audio data may be modulated according to a communication standard, such as a wireless communication protocol, and transmitted to decoding device 700. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from content provider 724 to decoding device 700.

The encoded video and/or audio data received from content provider 724 may be stored locally in memory 722. In accordance with an embodiment, the encoded video and/or audio data comprises one or more advertisements and/or one or more commercials that are to be spliced into content received via communications link 718. For example, the commercial(s) and/or advertisement(s) that are stored locally may be played back during commercial breaks of live content received via communications link 718. The advertisement(s)/commercial(s) may be targeted at the consumer. The advertisement(s)/commercial(s) may be targeted based on profile information determined for the consumer. The profile information may include any type of profile information, such as preference information (e.g., preferred restaurant types, food preferences, favorite cuisines, drink preferences, favorite places, etc.), interest information (e.g., hobbies, travel destinations, favorite sports, other specific interests, etc.), demographic information (e.g., age, sex, location of residence, marital status, socio-economic status, whether the person has children, etc.), and any other suitable profile information type.

Content provider 724 may periodically provide encoded video and/or audio data to decoding device 700. For example, content provider 724 may provide encoded video and/or audio data to decoding device 700 at one or more particular times during a day, one or more particular times during a week, one or more particular times during a month, etc. In another example, content provider 724 may provide content to decoding device 700 at times when decoding device 700 is not being utilized by a consumer.

In accordance with an embodiment, content provider 724 is the same entity that provides encoded video and/or audio data to decoding device 700 via communications link 718.

Encoding logic 728 may be configured to determine when encoded video and/or audio data stored in memory 722 (i.e., locally-stored content) is to be spliced into the encoded video and/or audio data received via communications link 718 and encode supplemental information and a marker (as described above with reference to FIG. 1) into the encoded video and/or audio data received via communications link 718. For example, encoding logic 728 may determine "higher layer" (e.g., transport layer) information indicative of a start time and/or end time of commercial within data stream represented by the encoded video and/or audio data received via communications link 718. The higher layer information may include program information, guide information, or any other suitable information. Based on the determined start and/or end times, encoding logic 728 may encode supplemental information into the data received via communications link 718.

The supplemental information signals to decoder 718 a transition point after which locally-stored content is to be spliced into the data received via communications link 718. The supplemental information may further specify the codec to be used by decoder 720 to decode the locally-stored content, a profile/level/tier of the locally-stored content, the resolution of the video and/or audio data of the locally-stored content, the picture rate and/or sample rate of the locally-stored content, among other useful information.

The inserted supplemental information may be encoded in the video layer and/or audio layer (as opposed to a higher layer, such as the transport layer). The supplemental information may be inserted after a bit stream corresponding to a particular one or more pictures (and/or audio frames) that comprise the video data (and/or audio data). The supplemental information may indicate the location of the transition between different codecs within the data. For example, the supplemental information may indicate the remaining number of picture(s) and/or audio frame(s) that are to be decoded by decoder 714 in accordance with a first codec. The supplemental information is inserted into the bit stream before the first picture (or first audio frame) that is to be decoded in accordance with a second codec that is different than the first codec to provide advance warning to decoder 714. In this way, decoder 714 can anticipate the change in codecs and properly decode the video and/or audio data in accordance with the second codec. Encoding logic 728 may further encode a marker after the last picture (and/or last audio frame) that indicates to decoder 714 that no more pictures and/or audio frames are to be decoded in accordance with the first codec and/or that subsequent picture(s) and/or audio frame(s) (i.e., the locally-stored content) are to be decoded in accordance with the second codec indicated by the supplemental information.

Decoder 714 is configured to decode the encoded video and/or audio data received via communications link 718 and decode the encoded video and/or audio data stored in memory 722. As described above, the encoded video and/or audio data received via communications link 718 may be encoded in accordance with a first codec and the encoded video and/or audio data stored in memory 722 may be encoded in accordance with a second codec that is different than the first codec. Thus, decoder 714 may be configured to switch between different codecs in real-time to properly decode the encoded video and/or audio data received via communications link 718 and the encoded video and/or audio data retrieved from memory 722 at the appropriate time.

For example, as shown in FIG. 7, decoder 714 includes splicing logic 720, which is configured to determine when encoded video and/or audio data stored in memory 722 (i.e., locally-stored content) is to be decoded and provided to output device 716 for playback instead of the encoded video and/or audio data received via communications link 718. For instance, splicing logic 720 may be configured to extract (e.g., decode) supplemental information that has been encoded in the video and/or audio data received via communications link 718 by encoding logic 728. Splicing logic 722 uses the supplemental information to determine a transition point after which locally-stored content is to be decoded and/or played back and a codec to be used to decode the locally-stored content. For example, as described above, the supplemental information may indicate the remaining number of picture(s) and/or audio frame(s) that are to be decoded by decoder 714 in accordance with the first codec before the transition point. The supplemental information is in the bit stream at a location before the last picture (or last audio frame) that is to be decoded in accordance with the first codec to provide advance warning to decoder 708. In this way, decoder 708 can anticipate the change in codecs and properly decode the locally-stored content in accordance with the second codec. In accordance with an embodiment, the transition point is the marker encoded in the data (e.g., an End of Sequence (EOS) indicator). The marker indicates that no more pictures and/or audio frames are to be decoded in accordance with the first codec and/or that subsequent picture(s) and/or audio frame(s) are to be decoded in accordance with a second codec indicated by the supplemental information (as described below).

Upon determining the transition point, decoder 714 may begin to flush out all the data (e.g., picture and/or audio frames) decoded before the determined transition point and reinitialize and/or configure itself to be ready to retrieve and decode the locally-stored content based on the information determined from the supplemental information. Upon reaching the transition point, decoder 714 replaces at least a portion of the video and/or audio data received via communications link 718 with the decoded locally-stored content.

The decoded video and/or audio data corresponding to the encoded video and/or audio data received from communications link 718 and decoded video and/or audio data corresponding to the locally-stored content stored in memory 722 may be displayed and/or played back via output device 716. Output device 716 may be integrated with, or external to, decoding device 700. In some examples, decoding device 700 may include an integrated output device and also be configured to interface with an external output device. In other examples, decoding device 700 may be an output device. Decoding device 700 may comprise any of a variety of output devices such as an LCD, a plasma display, an OLED display, speaker(s), or any other type of output device.

It is noted that while the foregoing embodiments describe that the supplemental information and the marker are encoded in the data received via communications link 718 by decoding device 700, it is noted that the supplemental information and the marker may instead be encoded by an intermediary device (e.g., a gateway device) coupled between the device providing the data received via communications link (e.g., first device 102, as shown in FIG. 1) and decoding device 700.

Figure 8:
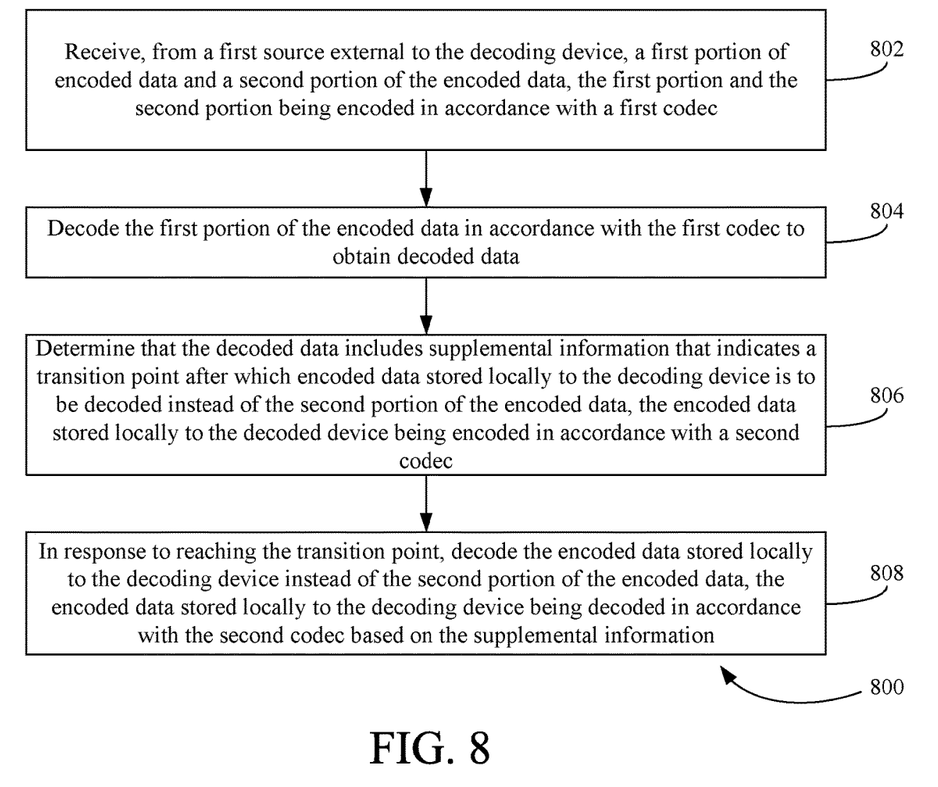
FIG. 8 shows a flowchart providing an example process performed by a decoding device to splice locally-stored content into content received from a remotely-located source in accordance with an embodiment.
Figure 9:
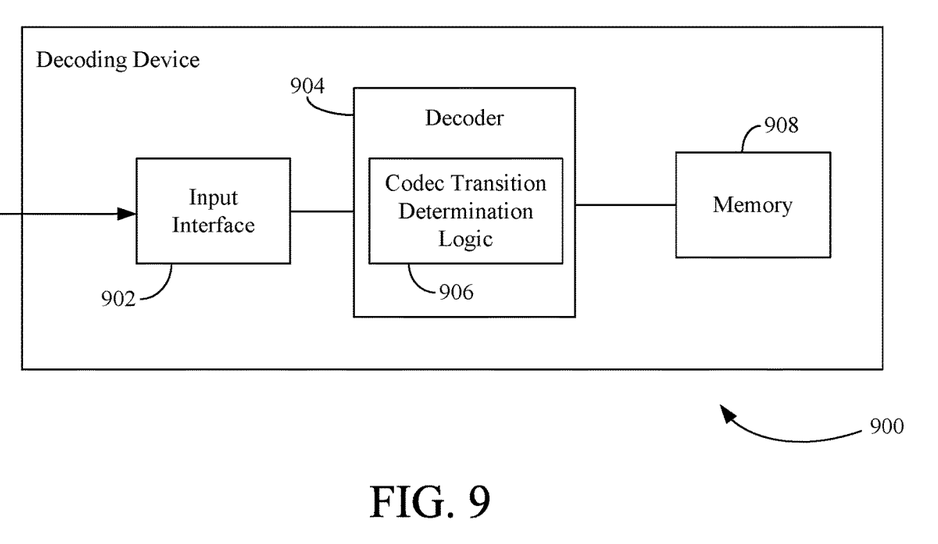
FIG. 9 shows a block diagram of an example decoding device in accordance with another embodiment.

Accordingly, in embodiments, a decoding device may splice locally-stored content into content received from a remotely-located source in many ways. For instance, FIG. 8 shows a flowchart 800 providing an example process performed by a decoding device (e.g., decoding device 700) to splice locally-stored content into content received from a remotely-located source in accordance with an embodiment. Flowchart 800 may be performed by decoding device 900, as shown in FIG. 9 for example. For illustrative purposes, flowchart 800 is described with respect to decoding device 900 shown in FIG. 9, which is an example of decoding device 700, according to an embodiment. As shown in FIG. 9, decoding device 900 includes input interface 902, decoder 904, which includes codec transition determination logic 906, and memory 908. Further structural and operational embodiments will be apparent to persons skilled in the relevant art(s) based on the discussion regarding flowchart 800.

As shown in FIG. 8, a first portion of encoded data and a second portion of the encoded data are received from a first source external the decoding device, the first portion and the second portion being encoded in accordance with a first codec (802). For example, with reference to FIG. 9, a first portion of encoded data and a second portion of the encoded data are received by input interface 902.

Continuing with FIG. 8, the first portion of the encoded data is decoded in accordance with the first codec to obtain decoded data (804). For example, with reference to FIG. 9, decoder 904 decodes the first portion of the encoded data in accordance with the first codec to obtain decoded data.

Continuing with FIG. 8, a determination is made that the decoded data includes supplemental information that indicates a transition point after which encoded data stored locally to the decoding device is to be decoded instead of the second portion of the encoded data in accordance with a second codec, the encoded data stored locally to the decoded device being encoded in accordance with a second codec (806). For example, with reference to FIG. 9, codec transition determination logic 906 determines that the decoded data includes the supplemental information.

In accordance with an embodiment, the supplemental information is encoded into the first portion of the encoded data by the decoding device.

Continuing with FIG. 8, in response to reaching the transition point, the encoded data stored locally to the decoding device is decoded instead of the second portion of the encoded data, the encoded data stored locally to the decoding device being decoded in accordance with the second codec based on the supplemental information instead (808). For example, with reference to FIG. 9, decoder 904 decodes the encoded data stored locally to the decoding device (e.g., stored in memory 908) instead of the second portion of the encoded data in accordance with the second codec based on the supplemental information.

Example Processor Implementation

Embodiments described herein, such as first device 102 and second device 104 (as shown in FIG. 1), decoding device 600 (as shown in FIG. 6), decoding device 700 (as shown in FIG. 7) and decoding device 900 (as shown in FIG. 9), along with any respective components/subcomponents thereof, and/or any flowcharts, further systems, sub-systems, components, and/or embodiments disclosed herein may be implemented in hardware (e.g., hardware logic/electrical circuitry), or any combination of hardware with one or both of software (computer program code or instructions configured to be executed in one or more processors or processing devices) and firmware. In embodiments with respect to the example computer implementations in this Section, main memory, memory cards and memory sticks, memory devices, and/or the like may include and or implement the described techniques and embodiments.

Figure 10:
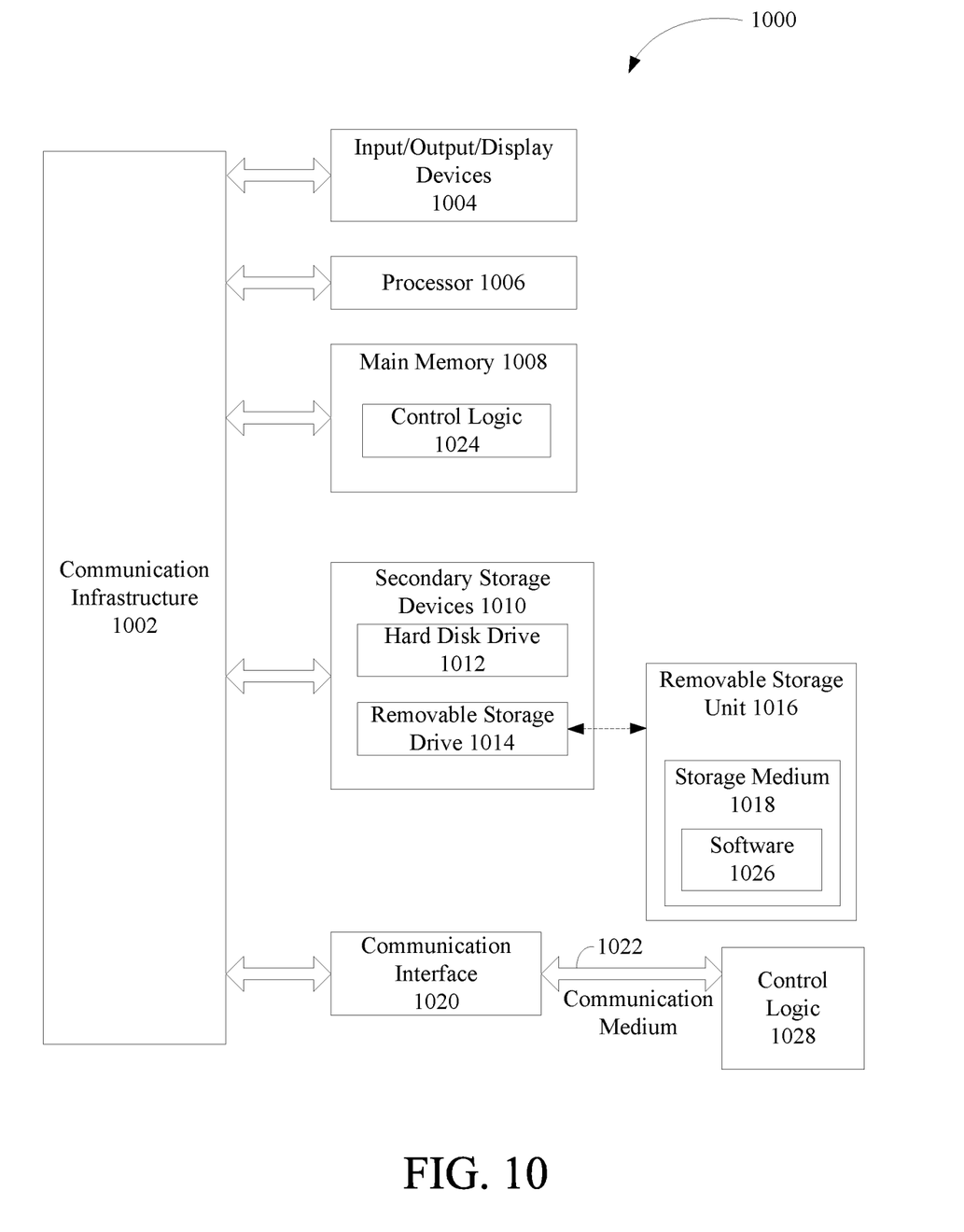
FIG. 10 shows a block diagram of a processing device/system in which the techniques disclosed herein may be performed and the embodiments herein may be utilized.

The embodiments described herein, including circuitry, devices, systems, methods/processes, and/or apparatuses, may be implemented in or using well known processing devices, communication systems, servers, and/or, computers, such as a processing device 1000 shown in FIG. 10. It should be noted that processing device 1000 may represent mobile devices, communication devices/systems, entertainment systems/devices, processing devices, and/or traditional computers in one or more embodiments. For example, first device 102 and second device 104 (as shown in FIG. 1), decoding device 600 (as shown in FIG. 6), decoding device 700 (as shown in FIG. 7) and decoding device 900 (as shown in FIG. 9) as described herein, and any of the sub-systems and/or components respectively contained therein and/or associated therewith, may be implemented in or using one or more processing devices 1000 and/or similar computing devices.

Processing device 1000 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 1000 may be any type of computer, including a desktop computer, a server, etc., and may be a computing device or system within another device or system.

Processing device 1000 includes one or more processors (also called central processing units, or CPUs), such as a processor 1006. Processor 1006 is connected to a communication infrastructure 1002, such as a communication bus. In some embodiments, processor 1006 can simultaneously operate multiple computing threads, and in some embodiments, processor 1006 may comprise one or more processors.

Processing device 1000 also includes a primary or main memory 1008, such as random access memory (RAM). Main memory 1008 has stored therein control logic 1024 (computer software), and data.

Processing device 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, processing device 1000 may include an industry standard interface, such a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1018 having stored therein computer software 1026 (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well-known manner.

Processing device 1000 also includes input/output/display devices 1004, such as touchscreens, LED and LCD displays, monitors, keyboards, pointing devices, etc.

Processing device 1000 further includes a communication or network interface 1020. Communication interface 1020 enables processing device 1000 to communicate with remote devices. For example, communication interface 1020 allows processing device 1000 to communicate over communication networks or mediums 1022 (representing a form of a computer useable or readable medium), such as LANs, WANs, the Internet, etc. Network interface 1020 may interface with remote sites or networks via wired or wireless connections.

Control logic 1028 may be transmitted to and from processing device 1000 via the communication medium 1022.

Any apparatus or manufacture comprising a computer useable or readable medium having control logic (software) stored therein is referred to herein as a computer program product or program storage device. This includes, but is not limited to, processing device 1000, main memory 1008, secondary storage devices 1010, and removable storage unit 1016. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 10) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1006 of FIG. 10), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method performed by a decoding device, the method comprising:
receiving encoded data comprising a first portion that is encoded in accordance with a first codec and a second portion that is encoded in accordance with a second codec, wherein the first codec uses a different coding scheme than the second codec;
decoding the first portion of the encoded data in accordance with the first codec to obtain decoded data;

determining that the encoded data includes supplemental information located within the first portion of the encoded data and before a last frame encoded using the first codec, after which the encoded data transitions to the second portion;

flushing the decoding device of the first portion of the encoded data in advance of reaching the transition point;

configuring the decoding device to decode the second portion in accordance with the second codec based on the transition point; and decoding the second portion of the encoded data in accordance with the second codec based on the supplemental information upon reaching the transition point.

2. The method of claim 1, wherein the encoded data comprises encoded video data or encoded audio data.

3. The method of claim 1, wherein the first portion comprises a plurality of first pictures that are encoded in accordance with the first codec, and wherein the second portion comprises a plurality of second pictures that are encoded in accordance with the second codec.

4. The method of claim 3, wherein the plurality of first pictures comprises:

a sequence of the first pictures, and wherein the supplemental information is located after a picture before a last picture in the sequence of the first pictures.

5. The method of claim 4, wherein the supplemental information further indicates a number of first pictures within the plurality of first pictures that are to be decoded before the transition point.

6. The method of claim 1, wherein the supplemental information further indicates at least one of:

the second codec to be used to decode the second portion of the encoded data;

one or more of a profile, level, and tier of the second portion of the encoded data; or a resolution of the second portion of the encoded data.

7. The method of claim 1, wherein the supplemental information comprises a Supplemental Enhancement Information message.

8. The method of claim 1, wherein the supplemental information comprises User Data.

9. A method performed by an encoding device, the method comprising:

inserting supplemental information in a first portion of data and before a last frame encoded using the first codec, the first portion to be encoded in accordance with a first codec, the supplemental information indicating a transition point after which a second portion of the data is to be encoded in accordance with a second codec, wherein the first codec uses a different coding scheme than the second codec; and inserting a marker in between the first portion and the second portion, the marker corresponding to the transition point, wherein the supplemental information is configured to provide advance warning of the transition point to a decoding device to flush the decoding device of the first portion in advance of reaching the transition point and to configure the decoding device to decode the second portion in accordance with the second codec based on the transition point.

10. The method of claim 9, wherein the data comprises at least one of video data or audio data.

11. The method of claim 9, wherein the first portion comprises a plurality of first pictures that are encoded in accordance with the first codec, and wherein the second portion comprises a plurality of second pictures that are encoded in accordance with the second codec.

12. The method of claim 11, wherein the plurality of first pictures comprises:

a sequence of the first pictures, and wherein the inserting comprises:

inserting the supplemental information after a picture before a last picture in the sequence of the first pictures.

13. The method of claim 12, wherein the supplemental information further indicates a number of first pictures of within the plurality of first pictures that are to be decoded by the decoding device before the transition point.

14. The method of claim 9, wherein the supplemental information further indicates at least one of:

the second codec to be used to decode the second portion of the encoded data;

one or more of a profile, level, and tier of the second portion of the encoded data; or a resolution of the second portion of the encoded data.

15. The method of claim 9, wherein the supplemental information comprises a Supplemental Enhancement Information message.

16. The method of claim 9, wherein the supplemental information comprises User Data.

17. A method performed by a decoding device, the method comprising:

receiving, from a first source external to the decoding device, a first portion of encoded data and a second portion of the encoded data, the first portion and the second portion being encoded in accordance with a first codec;

decoding the first portion of the encoded data in accordance with the first codec to obtain decoded data;

determining that the encoded data includes supplemental information within the first portion and before a last frame encoded using the first codec, that indicates a transition point after which encoded data stored locally to the decoding device is to be decoded, the encoded data stored locally to the decoded device being encoded in accordance with a second codec, wherein the first codec uses a different coding scheme than the second codec;

flushing the decoding device of the first portion of the encoded data in advance of reaching the transition point;

configuring the decoding device to decode the encoded data stored locally in accordance with the second codec based on the transition point; and decoding the encoded data stored locally to the decoding device in accordance with the second codec based on the supplemental information upon reaching the transition point.

* * * * *